US009243439B2

(12) United States Patent
Adams et al.

(10) Patent No.: US 9,243,439 B2
(45) Date of Patent: Jan. 26, 2016

(54) SYSTEM FOR SPEECH ACTIVATED MOVEMENT OF A VEHICLE BACKDOOR

(71) Applicant: Nissan North America, Inc., Franklin, TN (US)

(72) Inventors: Christopher Adams, Farmington Hills, MI (US); John Maranzano, Oxford, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 105 days.

(21) Appl. No.: 14/193,633

(22) Filed: Feb. 28, 2014

(65) Prior Publication Data

US 2015/0247352 A1 Sep. 3, 2015

(51) Int. Cl.

| | |
|---|---|
| ***G06F 17/00*** | (2006.01) |
| ***E05F 15/73*** | (2015.01) |
| ***G07C 9/00*** | (2006.01) |
| ***E05F 15/77*** | (2015.01) |
| ***E05F 15/40*** | (2015.01) |
| ***E05F 15/76*** | (2015.01) |

(52) U.S. Cl.

CPC ................ *E05F 15/73* (2015.01); *E05F 15/40* (2015.01); *E05F 15/76* (2015.01); *E05F 15/77* (2015.01); *G07C 9/00134* (2013.01); *E05Y 2900/50* (2013.01)

(58) Field of Classification Search

CPC ........... E05F 15/73; E05F 15/77; E05F 15/40; E05F 15/76; E05Y 2900/50; G07C 9/00134

See application file for complete search history.

(56) References Cited

U.S. PATENT DOCUMENTS

| | | | | |
|---|---|---|---|---|
| 4,501,012 | A * | 2/1985 | Kishi et al. | 704/275 |
| 4,506,378 | A * | 3/1985 | Noso et al. | 704/275 |
| 5,929,769 | A | 7/1999 | Garnault | |
| 6,496,107 | B1 | 12/2002 | Himmelstein | |
| 6,856,239 | B1 | 2/2005 | Hicks | |
| 7,057,307 | B2 | 6/2006 | Yokomori | |
| 7,688,179 | B2 | 3/2010 | Kurpinski et al. | |
| 8,091,280 | B2 | 1/2012 | Hanzel et al. | |
| 8,441,366 | B2 | 5/2013 | Buss | |
| 2006/0273879 | A1* | 12/2006 | Pudelko et al. | 340/5.72 |
| 2007/0146120 | A1* | 6/2007 | Kachouh | 340/5.72 |
| 2011/0118946 | A1 | 5/2011 | Reimann et al. | |
| 2011/0276234 | A1 | 11/2011 | Van Gastel | |
| 2011/0313619 | A1 | 12/2011 | Washeleski et al. | |
| 2012/0267442 | A1 | 10/2012 | Choi et al. | |
| 2013/0113614 | A1 | 5/2013 | Yopp | |
| 2013/0151084 | A1 | 6/2013 | Lee | |

* cited by examiner

*Primary Examiner* — Mary Cheung

(74) *Attorney, Agent, or Firm* — Young, Basile, Hanlon & MacFarlane, P.C.

(57) ABSTRACT

A vehicle includes a moveable closure panel and a system for activating movement of the closure panel. The system is configured to receive a voice command to move the closure panel, identify the location of an object in an area surrounding the vehicle, and if the object is within a predetermined zone of the area for permitting movement of the closure panel in accordance with the voice command, generate an instruction to move the closure panel in accordance with the voice command. The vehicle further includes at least one actuator responsive to the instruction to move the closure panel in accordance with the voice command.

16 Claims, 5 Drawing Sheets

SYSTEM FOR SPEECH ACTIVATED MOVEMENT OF A VEHICLE BACKDOOR

TECHNICAL FIELD

The embodiments disclosed herein generally relate to systems for activating movement of a backdoor or other closure panel in a vehicle.

BACKGROUND

A passenger vehicle may include a backdoor and/or other closure panels, such as side doors. Many if not all vehicles include systems that allow for manual movement of a given closure panel by a user of the vehicle. The interface between the vehicle and the user in these vehicles may include a lock and a handle, for example.

In some vehicles, the closure panel may additionally be powered for automatic movement. In order to activate automatic movement of the closure panel in these vehicles, the interface between the vehicle and the user may require the user to manually actuate a user input device, such as a remote controller or a request switch on the vehicle, or to make a gesture, such as a kick, toward the vehicle.

SUMMARY

Disclosed herein are embodiments of systems and methods for activating the movement of a closure panel in a vehicle with a voice command. In one aspect, a vehicle includes a moveable closure panel and a system for activating movement of the closure panel. The system is configured to receive a voice command to move the closure panel, identify the location of an object in an area surrounding the vehicle, and if the object is within a predetermined zone of the area for permitting movement of the closure panel in accordance with the voice command, generate an instruction to move the closure panel in accordance with the voice command. The vehicle further includes at least one actuator responsive to the instruction to move the closure panel in accordance with the voice command.

In another aspect, a method for activating movement of a moveable closure panel in a vehicle includes identifying a voice command to move the closure panel based on one or more sound signals indicating sound in an area surrounding the vehicle, identifying the location of an object in the area based on one or more proximity signals indicating objects in the area, and generating an instruction to move the closure panel in accordance with the voice command if the object is within a predetermined zone of the area for permitting movement of the closure panel in accordance with the voice command.

In yet another aspect, a vehicle includes a closure panel supported for movement between an open position and a closed position, at least one actuator for moving the closure panel, at least one sound sensor for generating one or more sound signals indicating sound in an area surrounding the vehicle, and at least one proximity sensor for generating one or more proximity signals indicating objects in the area. The vehicle further includes at least one vehicle controller in communication with the at least one actuator, the at least one sound sensor and the at least one proximity sensor. The least one vehicle controller is programmed to identify a voice command to move the closure panel based on the one more sound signals, identify the presence of an object within a closure panel zone of the area based on the one or more proximity signals, and control the at least one actuator to move the closure panel in response to the voice command and the object's presence within the closure panel zone.

These and other aspects will be described in additional detail below.

BRIEF DESCRIPTION OF THE DRAWINGS

The various features, advantages and other uses of the present systems and methods will become more apparent by referring to the following detailed description and drawings in which.

DETAILED DESCRIPTION

A vehicle according to the description that follows includes a power backdoor and system for activating automatic movement of the backdoor. The system is equipped to receive a voice command to move the backdoor, and to gather information concerning objects in an area surrounding the vehicle. The system, in implementation, can respond to the voice command by moving the backdoor after verifying that the locations of a user and other objects in the area are consistent with prescribed vehicle usage parameters.

Figure 1:
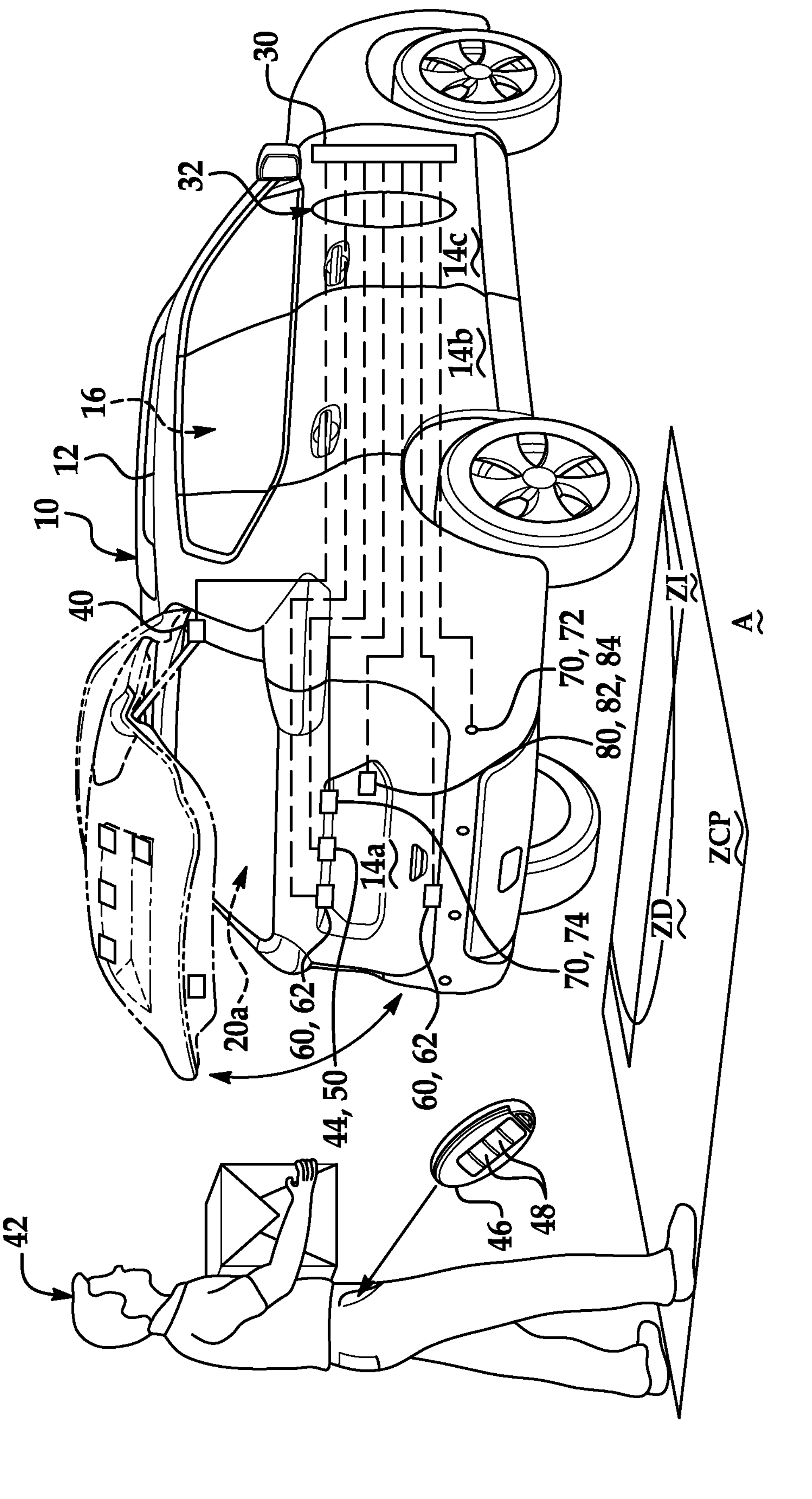
FIGS. 1 and 2 show a vehicle having a power backdoor and system for activating automatic movement of the backdoor, with FIG. 1 being a rear perspective view of the vehicle showing the backdoor in both a closed position and an open position, and with FIG. 2 being a system view of the vehicle.

A representative vehicle 10 is shown in FIG. 1. The vehicle 10 has a vehicle body structure 12 which, together with a backdoor 14*a*, side doors 14*b* and 14*c* and other vehicle panels, defines an interior 16 of the vehicle 10. The vehicle body structure 12 is at least partially open to define one or more openings, such as an opening 20*a* associated with the backdoor 14*a*, between the interior 16 of the vehicle 10 and an environment outside the vehicle 10.

As shown, the backdoor 14*a* is supported by the vehicle body structure 12 for movement with respect to the remainder of the vehicle 10. In particular, the backdoor 14*a* is supported for upward pivotal movement between a closed position, where the backdoor 14*a* closes the opening 20*a*, and one or more open positions. In an open position, the backdoor 14*a* is moved away from its closed position to expose the opening 20*a* and, for example, permit ingress to and egress from a rear cargo area of the interior 16 of the vehicle 10. The backdoor 14*a* may be configured as a so-called liftgate in accordance with the illustrated non-limiting example of the vehicle 10. For other examples of the vehicle 10, the backdoor 14*a* could alternatively be configured as one or more of a swinging door, a hatch, a trunk lid or a tailgate, for instance.

In addition to the backdoor 14*a*, the vehicle body structure 12 may support a number of other closure panels, such as the illustrated side doors 14*b* and 14*c*. The side doors 14*b* and 14*c*, similarly to the backdoor 14*a*, are supported by the vehicle body structure 12 for movement between a closed position and one or more open positions. In the illustrated example of the vehicle 10, the side doors 14*b* and 14*c* are configured as conventional swinging doors. For other examples of the vehicle 10, one or both of the side doors 14*b* and 14*c* could alternatively be configured as a sliding door, for instance.

Example systems and operations for activating automatic movement of a closure panel in a vehicle are described below with reference to the backdoor 14*a* of the illustrated example of the vehicle 10. However, it will be understood that the principles of these examples are suited for implementation with other vehicle closure panels. For the illustrated example of the vehicle 10, such closure panels could include the side doors 14*b* and 14*c*. For other examples of the vehicle 10, such closure panels may include any other type of vehicle panel that is supported directly or indirectly by the vehicle body structure 12 for swinging, slidable, retractable or other movement with respect to the remainder of the vehicle 10 between a closed position and one or more open positions.

Figure 2:
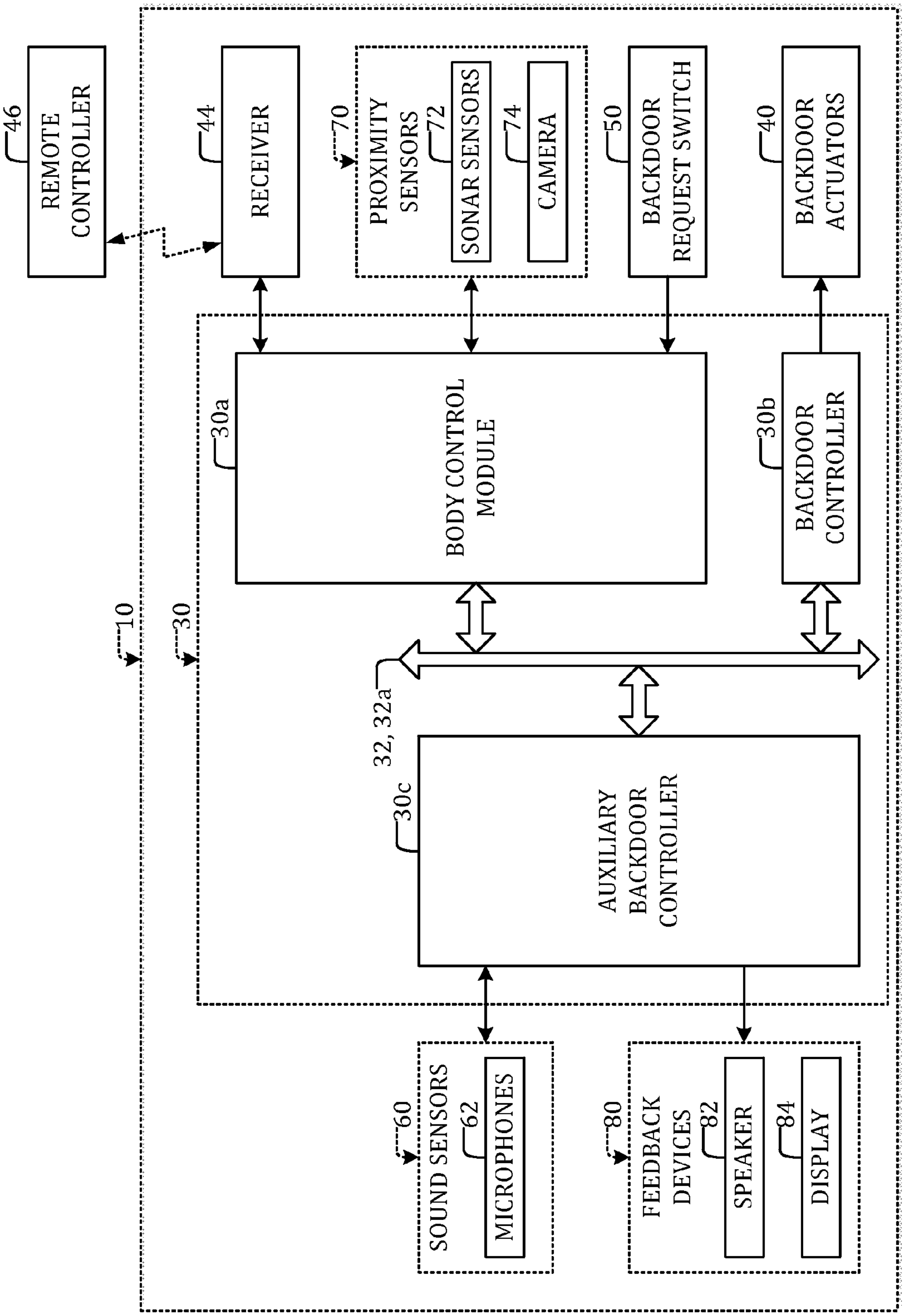

As shown with additional reference to FIG. 2, the vehicle 10 includes at least one vehicle controller 30. The vehicle controller 30 is communicatively coupled with a variety of componentry described in greater detail below over one or more communications channels 32 in order to provide the vehicle controller 30 with information and allow the vehicle controller 30 to control one or more of the electrical and/or electromechanical functions of the vehicle 10. The communication channel 32 may be or include one or more wired or wireless channels, for example, using standard or proprietary protocols.

The vehicle controller 30 may be one or multiple computers including a random access memory (RAM), a read-only memory (ROM) and a central processing unit (CPU) in addition to various input and output connections. Generally, the control functions of the vehicle 10 described herein can be implemented by one or more software programs stored in internal or external memory and are performed by execution by the CPU. However, some or all of the functions could also be implemented by hardware components.

The vehicle controller 30 can be a single controller, or, as indicated in FIG. 2, may include multiple separate controllers. In the example shown in FIG. 2, the controller 30 includes a body control module (BCM) 30*a*, a backdoor controller 30*b* and an auxiliary backdoor controller 30*c*. The body control module (BCM) 30*a*, the backdoor controller 30*b*, the auxiliary backdoor controller 30*c* and any other controllers can each be a dedicated electronic control unit (ECU) for controlling different functions of the vehicle 10. In this example, as shown, the communications channel 32 may include a controller area network (CAN) bus 32*a* configured to allow for sharing of information, data and/or computing resources between the BCM 30*a*, the backdoor controller 30*b* and the auxiliary backdoor controller 30*c*. It will be understood that references to the control functions of the (BCM) 30*a*, the backdoor controller 30*b* and the auxiliary backdoor controller 30*c* are provided as non-limiting examples, and that the any of the described control functions can be performed generally by any portion of the vehicle controller 30.

The vehicle 10 is equipped to support automatic powered movement of the backdoor 14*a*. In general, the vehicle 10 can include one or more powered backdoor actuators 40 that are coupled to the backdoor 14*a* and configured to actuate, under the control of the backdoor controller 30*b*, to move the backdoor 14*a* between its closed position and one or more open positions.

According to the illustrated example, the vehicle 10 may, for instance, include two motorized linear backdoor actuators 40 (one of the two backdoor actuators 40 is shown in FIG. 1) located at opposing sides of the backdoor 14*a*. In this example, the backdoor actuators 40 are connected between the vehicle body structure 12 and the backdoor 14*a*. The backdoor actuators 40 are arranged such that progressive extension of the backdoor actuators 40 under the control of the backdoor controller 30*b* moves the backdoor 14*a* from the closed position to multiple open positions, until the backdoor 14*a* is fully opened, and such that progressive retraction of the backdoor actuators 40 under the control of the backdoor controller 30*b* moves the backdoor 14*a* from an open position towards, and ultimately to, the closed position. In alternative examples of the vehicle 10, instead of the pair of backdoor actuators 40 located at opposing sides of the backdoor 14*a*, a single backdoor actuator 40 or more than two backdoor actuators 40 could be used in similar or different arrangements. Also, in these or other examples of the vehicle 10, the one or more backdoor actuators 40 could include other types of actuators other than the illustrated linear actuators.

The vehicle 10 is additionally equipped to establish one or more interfaces between the vehicle 10 and a user 42 of the vehicle 10 for activating automatic powered movement of the backdoor 14*a*.

For instance, as shown, the vehicle 10 can include a receiver 44 configured for wireless communication with a remote controller 46 for the vehicle 10. As a non-limiting example, the remote controller 46 can be a key fob for the vehicle 10, as shown in FIG. 1. In alternative examples, the remote controller 46 could be a cell phone or other remote electronic device. In these or other examples of the remote controller 46, the remote controller 46 and the receiver 44 can each include an antenna or other device enabling the transmission and receipt of radio signals, for instance. Alternatively, or additionally, the remote controller 46 and the receiver 44 can each include devices enabling the transmission and receipt of other types of signals, such as infrared signals.

According to the illustrated example, the remote controller 46 can include one or more inputs 48 that the user 42 can manipulate to communicate commands to the vehicle 10. The vehicle 10 can be responsive to the remote controller 46 to lock and unlock the vehicle 10, start the vehicle 10 or initiate a panic alarm, for example. The vehicle 10 can additionally be responsive to the remote controller 46 to move the backdoor 14*a*. According to the illustrated example, the user 42 can manipulate one or more of the inputs 48 of the remote controller 46 to communicate a command to move the backdoor 14*a*, for example, from the closed position to an open position or from an open position to the closed position. The remote controller 46 can be configured to transmit a signal indicating the command upon the manipulation of a dedicated input 48 associated with movement of the backdoor 14*a*, or, the remote controller 46 could be configured to transmit the signal upon the manipulation of a plurality of other inputs 48 in unison, in a predetermined sequence, or both. In the vehicle 10, the transmitted signal indicating the command communicated by the user 42 is received by the receiver 44, which, as shown, is communicatively coupled to the BCM 30*a*. The BCM 30*a* is responsive at least in part to corresponding input from the receiver 46 to generate a signal instructing the backdoor controller 30*b* to actuate the backdoor actuators 40 in order to move the backdoor 14*a* according to the command.

The communication between the remote controller 46 and the receiver 44 can also support other functions of the vehicle 10. For instance, the vehicle 10 can enable certain functions when it recognizes the presence of the remote controller 46. For the illustrated vehicle 10, these functions may include a function where the backdoor 14*a* is moved in response to the user 42 manipulating a backdoor request switch 50 at an exterior of the backdoor 14*a* when the presence of a correct remote controller 46 for the vehicle 10 is recognized in a detection zone ZD.

For purposes of control in connection with the detection zone ZD, it is assumed that the user 42 carries the remote controller 46 on their person, and therefore, that the location of the remote controller 46 can serve as a general proxy for the location of the user 42. The detection zone ZD, as shown in FIG. 1, is a zone in an area A surrounding the vehicle in the general proximity of the backdoor 14*a*. In particular, the detection zone ZD is adjacent to the backdoor 14*a* and extends from the backdoor 14*a* into the area A. The particular distance that the detection zone ZD extends into the area A can correspond to a minimum distance that the user 42 must be from the backdoor 14*a*, according to prescribed vehicle usage criteria, before the vehicle 10 enables the function where the backdoor 14*a* is moved in response to the user 42 manipulating a backdoor request switch 50. Although the detection zone ZD is presented in the drawings in a two dimensional space at the exterior of the vehicle 10 for ease of illustration, it will be understood that the detection zone ZD may occupy a three dimensional space in the general proximity of the backdoor 14*a*, and optionally, may extend into the interior 16 of the vehicle 10 as well.

The vehicle 10 can recognize the presence of the remote controller 46 in the detection zone ZD in a number of manners. In one example, the vehicle 10 can recognize the presence of the remote controller 46 in the detection zone ZD as a part of a certification process for the remote controller 46.

According to this example, the receiver 44, under the control of the BCM 30*a*, can periodically transmit an activation signal for the remote controller 46 into the area A surrounding the vehicle 10. The remote controller 46, in response to receiving one or more of the activation signals, can transmit one or more identification signals indicating an identification specific to the remote controller 46. In the vehicle 10, one or more transmitted identification signals are received by the receiver 44 and communicated to the BCM 30*a*, and, assuming that the identification signals indicate that the identification of the remote controller 46 is a match for the vehicle 10, the BCM 30*a* will certify the remote controller 46 as being correct for the vehicle 10.

In this example, the vehicle 10 and the remote controller 46 can be configured such that the certification of the remote controller 46 by the vehicle 10 supports recognition that the remote controller 46 is present in the detection zone ZD. For instance, the detection zone ZD may be defined by an effective communication range between the receiver 44 and the remote controller 46 for the activation signals transmitted by the receiver 44 and/or the identification signals transmitted by the remote controller 46. In one configuration, one or both of the activation signals and the identification signals can be low frequency radio (LF) signals, with the effective communication range between the receiver 44 and the remote controller 46 for the respective signals being approximately one meter. In this configuration, the detection zone ZD is generally defined as being approximately one meter in all directions surrounding the receiver 44. With the receiver 44 arranged with the backdoor request switch 50 as generally shown, the resulting detection zone ZD is adjacent to the backdoor 14*a* and extends, at the exterior of the vehicle 10, approximately one meter from the center of the backdoor 14*a* into the area A surrounding the vehicle 10. In this example, the detection zone ZD may also extend partially into the rear cargo area of the interior 16 of the vehicle 10. It will be understood that the above configuration is described as a non-limiting example. In alternative configurations, other types of signals, and optionally, different effective communication ranges, may be used.

The backdoor request switch 50 may be a button or other device that the user 42 can manipulate to communicate a command to move the backdoor 14*a*, for example, from the closed position to an open position or from an open position to the closed position. As shown, the backdoor request switch 50 is communicatively coupled to the BCM 30*a*, and the BCM 30*a* is responsive at least in part to input from the backdoor request switch 50 and a recognition of the presence of the remote controller 46 in the detection zone ZD to generate a signal instructing the backdoor controller 30*b* to actuate the backdoor actuators 40 in order to move the backdoor 14*a* according to the command communicated by the user 42.

The foregoing interfaces between the vehicle 10 and the user 42 for activating automatic powered movement of the backdoor 14*a*, while satisfactory, call for the user 42 to use their hands to manipulate a user input device, such as the remote controller 46 or the backdoor request switch 50. This may cause a degree of difficulty for the user 42 in situations, such as that illustrated in FIG. 1, where the user 42 is carrying a package or other load. The vehicle 10 of the present disclosure additionally, or alternatively, includes an interface that responds to a voice command from the user 42. In implementing a system employing this interface, the vehicle 10 can also verify that the locations of the user 42 and other objects in the area A surrounding the vehicle 10 are consistent with prescribed vehicle usage parameters before acting on the voice command by moving the backdoor 14*a*.

In order to identify a voice command from the user 42, the vehicle 10 includes one or more sound sensors 60 for sensing sound in the area A surrounding the vehicle 10. The sound sensors 60 can be or include any devices configured to sense sound in the area A and generate sound signals corresponding to the sensed sound for communication to the auxiliary backdoor controller 30*c*.

According to the illustrated and non-limiting example of the vehicle 10 shown in FIGS. 1 and 2, the one or more sound sensors 60 include one or more microphones 62. In this example, the microphones 62 may be located about the vehicle 10 to sense sound throughout the area A surrounding the vehicle 10. Alternatively, the microphones 62 can be located to sense sound in certain portions of the area A, such as in the general proximity of the backdoor 14*a*, as shown in FIG. 1. In the illustrated example of the vehicle 10, one or more of the microphones 62 are located at an exterior of the backdoor 14*a* to sense sound in the proximity of the backdoor 14*a* when the backdoor 14*a* is in the closed position. Additionally, one or more of the microphones 62 are located at an underside of the backdoor 14*a*, in an area typically including a lock for securing the backdoor 14*a* in the closed position, to sense sound in the proximity of the backdoor 14*a* when the backdoor 14*a* is in an open position. These microphones 62 could also be located in the rear cargo area of the interior 16 of the vehicle 10, for example.

In order to identify objects, the vehicle 10 includes one or more proximity sensors 70 for sensing objects in the area A surrounding the vehicle 10. The proximity sensors 70 can be or include any devices configured to sense the presence and location of objects in the area A and generate proximity signals corresponding to the presence and location of the objects. The proximity sensors 70 could be dedicated for use in the system for moving the backdoor 14*a*, in which case the generated proximity signals can be communicated to the auxiliary backdoor controller 30*c*. However, in the illustrated configuration of the vehicle 10, it is contemplated that the proximity sensors 70 may already be present in the vehicle 10 to support other functions controlled by the BCM 30*a*, such as, for example, a backup function or an automatic parking function. In this configuration, as shown in FIG. 2, the generated proximity signals can be communicated to the BCM 30*a* and shared with the auxiliary backdoor controller 30*c* over the CAN bus 32*a*.

According to the illustrated and non-limiting example of the vehicle 10 shown in FIGS. 1 and 2, the one or more proximity sensors 70 include a plurality of sonar sensors 72, and/or at least one camera 74. In this example, the sonar sensors 72 and the camera 74 can be located about the vehicle 10 to sense objects throughout the area A surrounding the vehicle 10. Alternatively, the sonar sensors 72 and the camera 74 can be located to sense objects in certain portions of the area A, such as in the general proximity of the backdoor 14*a*, as shown in FIG. 1. In the illustrated example of the vehicle 10, the sonar sensors 72 are located in a linear array at an exterior of the vehicle 10 below the backdoor 14*a*, and the camera 74 is located at an exterior of the backdoor 14*a*. However, it will be understood that alternative locations could be used for either the sonar sensors 72 or the camera 74.

The proximity sensors 70 are located and configured to sense at least those objects, if any, present within a closure panel zone ZCP. It will be understood that, in general, sensing objects present within the closure panel zone ZCP may be inclusive of identifying that there are not any objects present the closure panel zone ZCP.

As shown, the closure panel zone ZCP is adjacent to the backdoor 14*a* and extends from the backdoor 14*a* into the area A surrounding the vehicle 10. The particular distance that the closure panel zone ZCP extends into the area A can correspond to a minimum distance that the user 42 must be from the backdoor 14*a*, according to prescribed vehicle usage criteria, before the vehicle 10 enables the function where the backdoor 14*a* is moved in response to a voice command from the user 42. Although the closure panel zone ZCP is presented in the drawings in a two dimensional space at the exterior of the vehicle 10 for ease of illustration, it will be understood that the closure panel zone ZCP may occupy a three dimensional space in the general proximity of the backdoor 14*a*.

The proximity sensors 70 may also be located and configured to sense those objects, if any, present within an interference zone ZI. It will be understood that, in general, sensing objects present within the interference zone ZI may be inclusive of identifying that there are not any objects present the interference zone ZI.

As shown, the interference zone ZI is adjacent to the backdoor 14*a* and extends from the backdoor 14*a* into the area A surrounding the vehicle 10. The interference zone ZI may be, or include, any portions of the area A where the presence of the user 42 or other objects, or the presence of a portion of the user 42 or other object, will interfere with movement of the backdoor 14*a*. The interference zone ZI can be defined as a zone where a given movement of the backdoor 14*a* will cause the backdoor 14*a* to contact any objects that are present in the zone. Alternatively, the interference zone ZI could additionally include some areas outside of such a zone to provide a certain degree of a buffer for the movement of the backdoor 14*a*. Although the interference zone ZI is shown as being a single fixed interference zone ZI, it will be understood that the interference zone ZI could vary for different objects and/or different movements of the backdoor 14*a*. In addition, although the interference zone ZI is presented in the drawings in a two dimensional space at the exterior of the vehicle 10 for ease of illustration, it will be understood that the interference zone ZI may occupy a three dimensional space in the general proximity of the backdoor 14*a*.

In addition to the sound sensors 60 and the proximity sensors 70, the vehicle 10 may include one or more feedback devices 80. The feedback devices 80 may be any devices for conveying information to the user 42 while the user 42 is located in the general proximity of the backdoor 14*a* or otherwise in the area A surrounding the vehicle 10. The feedback devices 80 may, for example, include a speaker 82 for conveying information to the user 42 in an audible format, or, an electronic display 84 for conveying information to the user 42 in a visible format. In the illustrated example of the vehicle 10, the feedback devices 80 are dedicated for use in a system for moving the backdoor 14*a*, and are in communication with the auxiliary backdoor controller 30*c* for receiving signals corresponding to the information to be conveyed to the user 42. In other examples, the functions of the feedback devices 80 may be accomplished with devices already present in the vehicle 10, such as lights and horns, for example, in which case the feedback devices 80 may be in communication with the BCM 30*a* for receiving signals corresponding to the information to be conveyed to the user 42.

Figure 3:
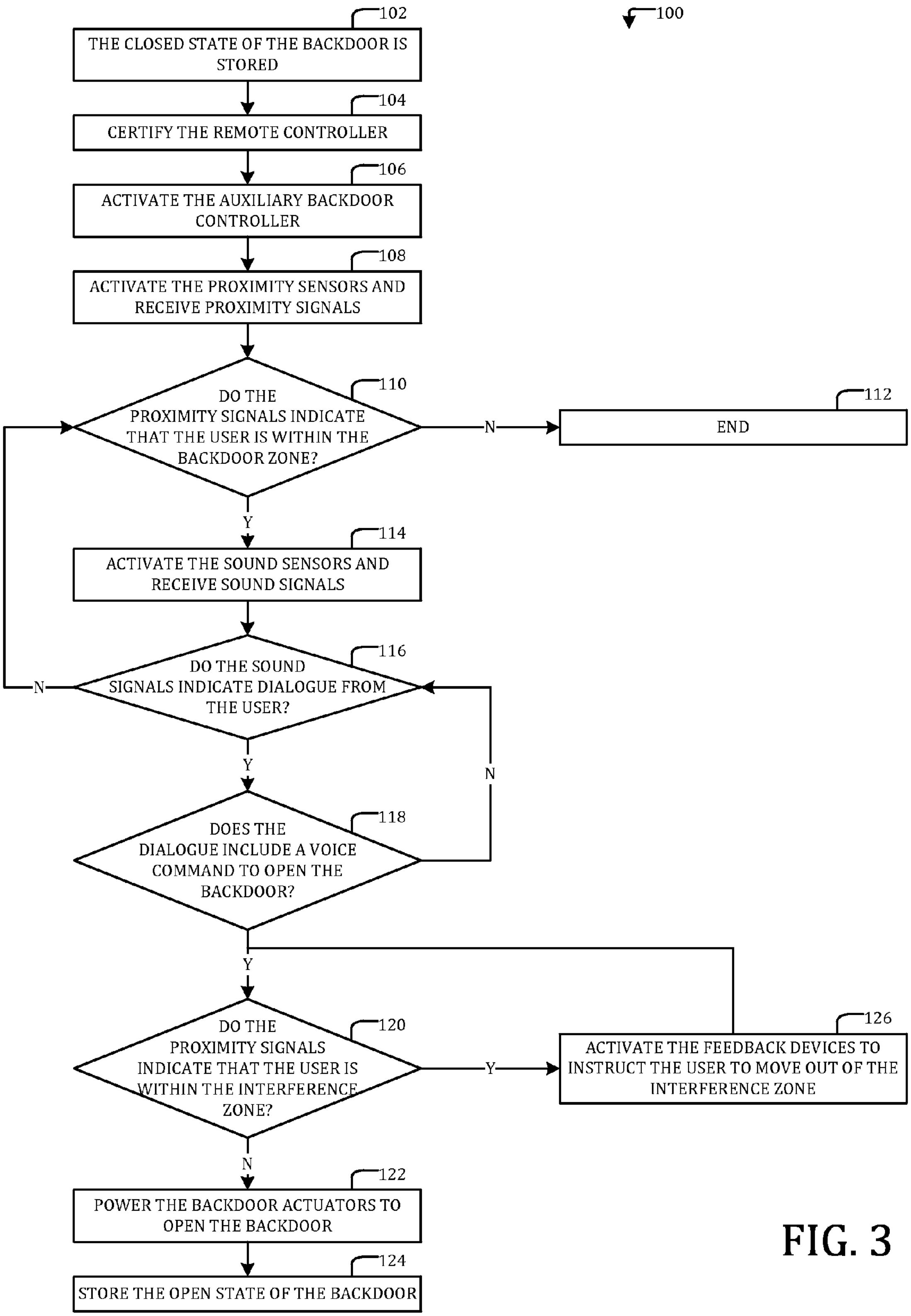
FIG. 3 is a flow diagram showing operations for activating an automatic switch of the position of the backdoor from the closed position to an open position.
Figure 4:
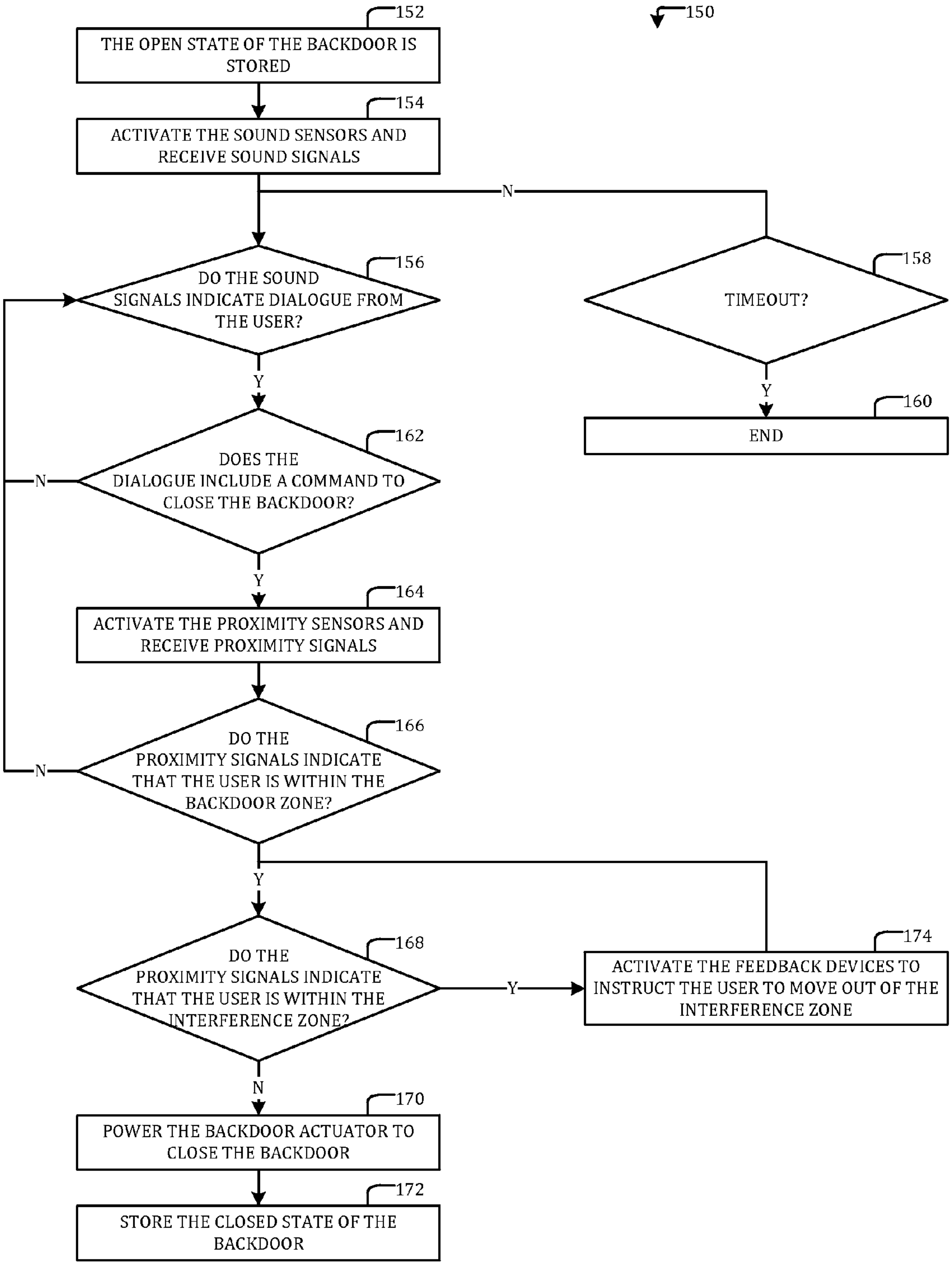
FIG. 4 is a flow diagram showing operations for activating an automatic switch of the position of the backdoor from an open position to the closed position.
Figure 5:
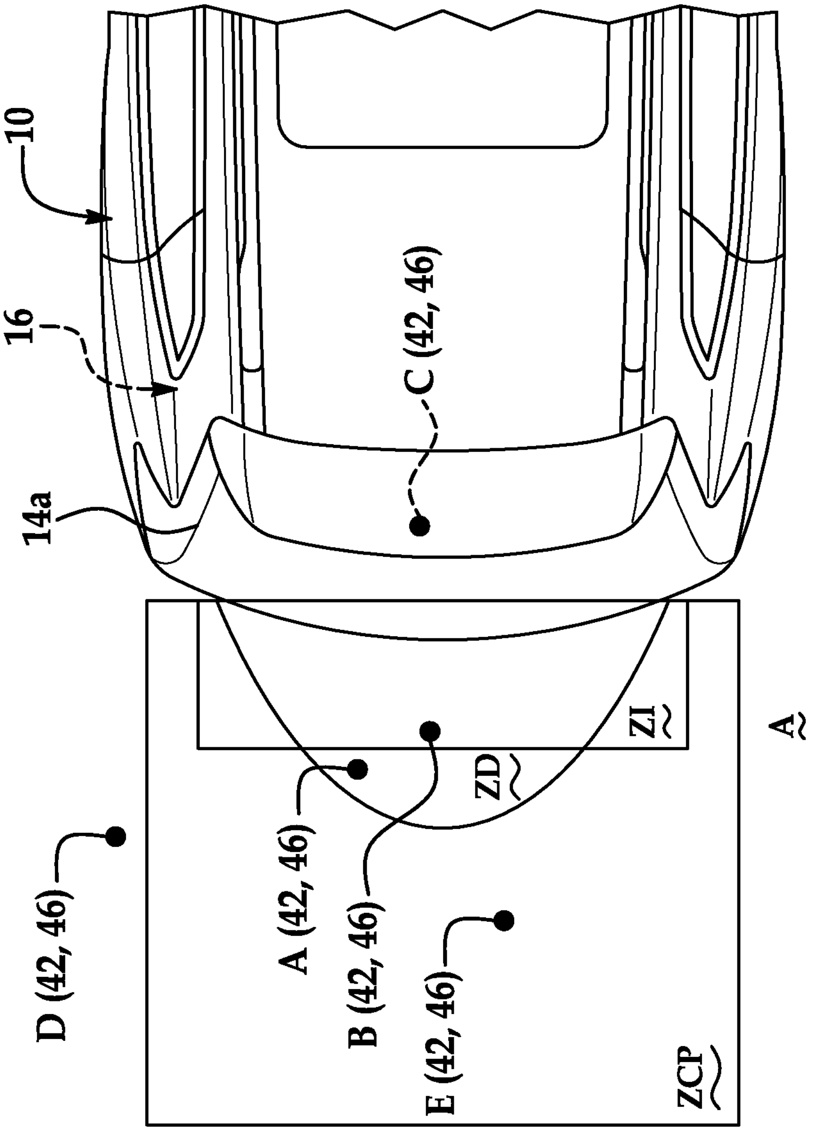
FIG. 5 is a top view of the vehicle showing the location of a user of the vehicle in different situations and referenced in explaining the operations shown in FIGS. 3 and 4.

Example operations for use in implementing a system for activating automatic movement of the backdoor 14*a* in the vehicle 10 are shown in FIGS. 3 and 4 and explained with additional reference to FIG. 5.

The operations of an example process 100 for moving the backdoor 14*a* from the closed position to an open position are shown in FIG. 3. The process 100 is implemented when the closed state of the backdoor 14*a* is stored, as indicated with operation 102. The process 100 is initiated by operation 104 when the user 42, carrying the remote controller 46 on their person, enters the detection zone ZD. In operation 104, the vehicle 10 certifies the remote controller 46 as being correct for the vehicle 10, and optionally, recognizes the presence of the remote controller 46 in the detection zone ZD. Different example locations A and B for the user 42, where the user 42 has entered a portion of the detection zone ZD extending into the area A surrounding the vehicle 10, are shown in FIG. 5. An additional example location C for the user 42 is also shown where the user 42 is located in a portion of the detection zone ZD extending into the rear cargo area of the interior 16 of the vehicle 10.

In examples of the vehicle 10 where the BCM 30*a* or other portion of the vehicle controller 30 is used to certify the remote controller 46 as being correct for the vehicle 10, in operation 106, the auxiliary backdoor controller 30*c* is activated. In the vehicle 10 according to these examples, the auxiliary backdoor controller 30*c* may be a dedicated controller used to implement all or portions of the interface between the vehicle 10 and the user 42 according to the process 100. The potential advantages of this configuration may include, for example, energy conservation for the vehicle 10. For instance, it may be desirable for the BCM 30*a* to be wholly or partially inactive except when the vehicle 10 is started or when the BCM 30*a* is needed to certify the remote controller 46 or perform other minor functions. To avoid energy usage by the BCM 30*a*, once the remote controller 46 is certified, the BCM 30*a* can pass control over the process 100 to the auxiliary backdoor controller 30*c* by generating a signal to activate the auxiliary backdoor controller 30*c*.

In operation 108, the proximity sensors 70 are activated. With the proximity sensors 70 activated, proximity signals are generated and communicated to the vehicle controller 30. The proximity signals, as described above, indicate the presence and location of objects, if any, present within the closure panel zone ZCP, and optionally, in other portions of the area A surrounding the vehicle 10. According to the configuration of the vehicle 10 described above, the auxiliary backdoor controller 30*c* may, as needed, generate one or more signals to temporarily activate the BCM 30*a* to activate the proximity sensors 70, receive the generated proximity signals and share the proximity signals with the auxiliary backdoor controller 30*c* over the CAN bus 32*a*.

In general, as a prerequisite to activating automatic movement of the backdoor 14*a* in response to a voice command from the user 42, the vehicle 10 may first verify that the user 42 and other objects in the area A surrounding the vehicle 10 are located within a predetermined zone of the area A for permitting movement of the backdoor 14*a* in accordance with the voice command. The predetermined zone may be defined in whole or in part for consistency with prescribed vehicle usage parameters in connection with a given movement of the backdoor 14*a*. The predetermined zone, in the non-limiting examples discussed below, may be inclusive of the closure panel zone ZCP, exclusive of the interference zone ZI, or both.

As in initial step in this verification according to the example process 100, in operation 110, the vehicle 10 identifies, based on the proximity signals, whether the user 42 is located within the closure panel zone ZCP.

In some instances, a positive identification that the user 42 is located within the closure panel zone ZCP may follow from the recognition of the presence of the remote controller 46 in the detection zone ZD after the remote controller 46 is certified. This may be the case, for instance, for the example locations A and B for the user 42, where the user 42 is located in a portion of the detection zone ZD that is included in the closure panel zone ZCP.

In other instances, the vehicle 10 may fail to identify that the user 42 is located within the closure panel zone ZCP after the remote controller 46 is certified. This may be the case, for instance, where the user 42 is located outside of the area A surrounding the vehicle 10 or otherwise beyond the sensing capabilities of the proximity sensors 70, such as in the example location C for the user 42 in which the user 42 is located in the interior 16 of the vehicle 10. This may also be the case, for instance, where the vehicle 10 has tracked movement of the user 42, following certification of the remote controller 46, to an example position D beyond the closure panel zone ZCP. This may occur, for example, if the user 42 has simply walked past the backdoor 14*a*. Thus, according to these examples, it will be understood that a failure to identify that the user 42 is located within the closure panel zone ZCP could result from either a failure to identify the location of the user 42 altogether (occurring, for instance, with the example location C for the user 42), or, when the location of the user 42 is identified but the user 42 is not located within the closure panel zone ZCP (occurring, for instance, with the example location D for the user 42).

In operation 110, an assumption may be made that any objects indicated by the proximity signals, whether included in the closure panel zone ZCP or elsewhere in the area A surrounding the vehicle 10, are the user 42. However, an optional additional determination can be made as to whether or not an indicated object can be identified as the user 42. In this determination, objects common to the area A surrounding the vehicle 10, such as walls, garage doors, carts, poles or any other objects can be identified as not being the user 42 in order to prevent unintended or movement of the backdoor 14*a*.

If the vehicle 10 fails to identify that the user 42 is located within the closure panel zone ZCP in operation 110, the process 100 ends in operation 112. However, if a positive identification is made that the user 42 is located within the closure panel zone ZCP, the process 100 proceeds to operation 114. In operation 114, the sound sensors 60 are activated. With the sound sensors 60 activated, sound signals are generated and communicated to the vehicle controller 30. The sound signals, as described above, indicate sound in the general proximity of the backdoor 14*a*, and optionally, in other portions of the area A surrounding the vehicle 10. According to the configuration of the vehicle 10 described above, the auxiliary backdoor controller 30*c* may generate one or more signals to activate the sound sensors 60 to generate sound signals for communication to the backdoor controller 30*c*.

In operation 116, the vehicle 10 identifies, based on the sound signals, whether or not the sound signals indicate spoken dialogue from the user 42. If dialogue from the user 42 is not identified, the process 100 returns to operation 110, where the vehicle identifies whether the user 42 is still located within the closure panel zone ZCP. As generally indicated, the process 100 may prolong generation of the sound signals and attempts to identify spoken dialogue from the user 42 according to operations 114 and 116 for as long as the user 42 remains within the closure panel zone ZCP. Alternatively, the process 100 may implement a timeout function in which the process 100 ends in operation 112 after failing to identify any dialogue from the user 42*a* for a predetermined period of time.

If dialogue from the user 42 is identified, the dialogue is analyzed in operation 118 to determine whether it includes a voice command from the user 42 to move the backdoor 14*a* from the closed position to an open position. If the dialogue does not include a voice command from the user 42 to move the backdoor 14*a* from the closed position to an open position, the process returns to operation 116. If, however, the dialogue does include a voice command from the user 42 to move the backdoor 14*a* from the closed position to an open position, the process continues to operation 120.

Both the identification of dialogue from the user 42 according to operation 116, and the identification of whether the dialogue includes a voice command from the user 42 to move the backdoor 14*a* from the closed position to an open position according to operation 118, may be based in whole or in part on the principles of speech recognition, voice recognition or other systems. In one non-limiting example, the vehicle 10 can implement a so-called speaker dependent discrete word system, for instance.

According to operation 120, the vehicle 10 may optionally supplement its verification that the user 42 and other objects in the area A surrounding the vehicle 10 are located within a predetermined zone of the area A for permitting movement of the backdoor 14*a* by identifying, based on the proximity signals, whether the user 42 is located outside of the interference zone ZI for movement of the backdoor 14*a* in accordance with the voice command from the user 42. In operation 120, as in operation 110, an assumption may be made that any objects indicated by the proximity signals are the user 42, or alternatively, an additional determination can be made of whether or not an indicated object can be identified as not being the user 42.

The process 100, in accordance with the description above, may advance from operations 104 and operation 110 to operation 120 for the example initial locations A and B for the user 42. If, for instance, the user 42 has remained in the location A for the user 42, in operation 120, the vehicle 10 will identify that the user 42 is outside of the interference zone ZI, and the process will 100 proceed to operation 122. In operation 122, the vehicle 10 automatically moves the backdoor 14*a*, in accordance with the voice command from the user 42, from the closed position to an open position. In particular, for the example vehicle 10, the auxiliary backdoor controller 30*c* will generate one or more signals to activate the backdoor controller 30*b* to, in turn, generate one or more signals to actuate the backdoor actuators 40 in order to move the backdoor 14*a* from the closed position to an open position. To complete the process 100, the vehicle 10 will store the open state of the backdoor 14*a* in operation 124.

However, for other locations of the user 42, the vehicle 10 may fail in operation 120 to identify that the user 42 is outside of the interference zone ZI. This may be the case, for instance, if the user 42 has remained in the location B for the user 42 following the time that the vehicle 10 certified the remote controller 46 in operation 104. Alternatively, this may be the case if the user 42 has moved to the location B for the user 42 from the location A for the user 42 between the time that the vehicle 10 certified the remote controller 46 in operation 104 and the time of the identification in operation 118 that dialogue from the user 42 includes a voice command to move the backdoor 14*a* from the closed position to an open position.

If the vehicle 10 fails in operation 120 to identify that the user 42 is outside of the interference zone ZI, in operation 126, the vehicle 10 instructs the user 42 to move out of the interference zone ZI or otherwise clear the interference zone ZI of objects. In particular, for the example vehicle 10, the auxiliary backdoor controller 30*c* will generate one or more signals to activate the feedback devices 80 to convey an instruction to the user 42 to clear the interference zone ZI of objects.

In examples of the vehicle 10 where the feedback devices 80 include the speaker 82, the electronic display 84 or similar devices, the instruction to the user 42 can be explicit. For instance, the instruction could be an audible instruction to move away from the backdoor 14*a* or a visual likeness illustrating movement of the user 42 or other object out of the interference zone ZI. However, in examples of the vehicle 10 where the feedback devices 80 include devices such as an already present horn or light, the instruction to the user 42 can be implicit within the context of the voice command from the user 42 to move the backdoor 14*a*. For instance, the instruction could be a horn chip or light flash.

Following operation 126, the process returns to operation 120. It will be understood in connection with the discussion of the operations 110 and 120 that the operations 110 and 120 are not limited to being performed sequentially, and that in some examples of the vehicle 10, these operations may each be performed continuously and simultaneously for all or certain portions of the process 100. Therefore, upon return to operation 120, it will be understood that the vehicle 10 may generally track the location of the user 42 not only to ensure that the user 42 moves outside of the interference zone ZI, but also to ensure that the user 42 remains located within the closure panel zone ZCP.

It can be seen that if, for instance, the user 42 responds to the instruction to move out of the interference zone ZI by moving to the location A for the user 42, then the process 100 will proceed to operation 122. Similarly, the process 100 will proceed to operation 122 if the user 42 responds to the instruction to move out of the interference zone ZI by moving to a position E for the user 42 outside of the initial detection zone ZD but within the closure panel zone ZCP and outside of the interference zone ZI. The process 100, however, may end in operation 112 if the user 42 responds to the instruction to move out of the interference zone ZI by moving to a position D which, although outside of the interference zone ZI, is beyond the closure panel zone ZCP.

If the vehicle 10 once again fails in operation 120 to identify that the user 42 is outside of the interference zone ZI, the process 100 once again continues to operation 126. The process 100 may, for example, implement a timeout function in which the process 100 ends in operation 112 after failing to identify that the user 42 is outside of the interference zone ZI for a predetermined period of time.

The operations of an example process 150 for moving the backdoor 14*a* from an open position to the closed position are shown in FIG. 4. Certain of the operations of the process 150 may be substantially similar to operations of the process 100 described above. For these operations, the similar operations of the process 100 are referenced without repeating the full detailed description above. In the process 150, it will be that one or both of the closure panel zone ZCP and the interference zone ZI could be defined differently for the movement of the backdoor 14*a* from an open position to the closed position as compared to the movement of the backdoor 14*a* from the closed position to an open position.

The process 150 is implemented when an open state of the backdoor 14*a* is stored, as indicated with operation 152. In operation 154, similarly to operation 114 of the process 100, the sound sensors 60 are activated, and sound signals are generated and communicated to the vehicle controller 30. In operation 156, similarly to operation 116 of the process 100, the vehicle 10 identifies, based on the sound signals, whether or not the sound signals indicate spoken dialogue from the user 42. As shown, after failing to identify any dialogue from the user 42*a* for a predetermined period of time, the process 150 implements a timeout function in operation 158 and ends in operation 160. Alternatively, for security reasons, the process 150 could advance directly to operation 168 after a predetermined period of time.

If dialogue from the user 42 is identified, the dialogue is analyzed in operation 162, similarly to operation 118 of the process 100, to determine whether it includes a voice command from the user 42 to move the backdoor 14*a* from its open position to the closed position. If the dialogue does not include a voice command from the user 42 to move the backdoor 14*a* from its open position to the closed position, the process returns to operation 156. If, however, the dialogue does include a voice command from the user 42 to move the backdoor 14*a* from its open position to the closed position, the process continues to operation 164.

In operation 164, the proximity sensors 70 are activated, similarly to operation 108 of the process 100, and proximity signals are generated and communicated to the vehicle controller 30. For the process 150, similarly to the process 100, in general, as a prerequisite to activating automatic movement of the backdoor 14*a* in response to the voice command from the user 42, the vehicle 10 may first verify that the user 42 and other objects in the area A surrounding the vehicle 10 are located within a predetermined zone of the area A for permitting movement of the backdoor 14*a* in accordance with the voice command. As indicated in operation 166, as an initial step in this verification according to the example process 150, the vehicle 10 identifies, based on the proximity signals, whether the user 42 is located within the closure panel zone ZCP.

If the vehicle 10 fails to identify that the user 42 is located within the closure panel zone ZCP, the process 150 returns to operation 156. Once again, it will be understood that a failure to identify that the user 42 is located within the closure panel zone ZCP could result from either a failure to identify the location of the user 42 altogether, or, when the location of the user 42 is identified but the user 42 is not located within the closure panel zone ZCP. Alternatively to returning to operation 156, the process 150 may implement a timeout function in which the process 150 ends in operation 160 after failing to identify that the user 42 is located within the closure panel zone ZCP for a predetermined period of time, or, for security reasons, the process 150 could advance directly to operation 168 after a predetermined period of time.

If a positive identification is made that the user 42 is located within the closure panel zone ZCP, the process 150 proceeds to operation 168. According to operation 168, similarly to operation 120 of the process 100, the vehicle 10 may optionally supplement its verification that the user 42 and other objects in the area A surrounding the vehicle 10 are located within a predetermined zone of the area A for permitting movement of the backdoor 14*a* by identifying, based on the proximity signals, whether the user 42 is located outside of the interference zone ZI for movement of the backdoor 14*a* in accordance with the voice command from the user 42.

If, in operation 168, the vehicle 10 identifies that the user 42 is outside of the interference zone ZI, the process 150 will proceed to operation 170. In operation 170, similarly to operation 122 of the process 100, the vehicle 10 automatically moves the backdoor 14*a*, in accordance with the voice command from the user 42, from its open position to the closed position. To complete the process 150, the vehicle 10 will store the closed state of the backdoor 14*a* in operation 172.

If the vehicle 10 fails in operation 168 to identify that the user 42 is outside of the interference zone ZI, in operation 174, similarly to operation 126 of the process 100, the vehicle 10 instructs the user 42 to move out of the interference zone ZI or otherwise clear the interference zone ZI of objects. Similarly to the process 100 described above, following operation 174, the process 150 returns to operation 168. It will be understood in connection with the discussion of the operations 166 and 168 that in some examples of the vehicle 10 these operations may each be performed continuously and simultaneously for all or certain portions of the process 150. Therefore, upon return to operation 168, it will be understood that the vehicle 10 may generally track the location of the user 42 not only to ensure that the user 42 moves outside of the interference zone ZI, but also to ensure that the user 42 remains located within the closure panel zone ZCP.

If the vehicle 10 once again fails in operation 168 to identify that the user 42 is outside of the interference zone ZI, the process 150 once again continues to operation 174. The process 150 may, for example, implement a timeout function in which the process 150 ends in operation 160 after failing to identify that the user 42 is outside of the interference zone ZI for a predetermined period of time.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A vehicle, comprising:
- a moveable closure panel;
- a system for activating movement of the closure panel, the system configured to:
  - receive a voice command to move the closure panel,
  - identify the location of an object in an area surrounding the vehicle,
  - identify when the object or another object is in an interference zone around the moveable closure panel,
  - when the object is within a predetermined zone of the area for permitting movement of the closure panel in accordance with the voice command and not identified in the interference zone, generate an instruction to move the closure panel in accordance with the voice command, and
  - when the object or the other object is identified within the interference zone, instruct a user of the vehicle to clear the interference zone; and
- at least one actuator responsive to the instruction to move the closure panel in accordance with the voice command.

2. The vehicle of claim 1, wherein the system is further configured to identify the object as a user of the vehicle prior to generating the instruction to move the closure panel in accordance with the voice command.

3. The vehicle of claim 1, wherein the voice command is to switch the position of the closure panel from a closed position to an open position, and the predetermined zone is a closure panel zone adjacent to the closure panel.

4. The vehicle of claim 1, wherein the voice command is to switch the position of the closure panel from an open position to a closed position, and the predetermined zone is outside of the interference zone for the closure panel.

5. The vehicle of claim 1, wherein the system is further configured to certify a remote controller for the vehicle in the area prior to generating the instruction to move the closure panel in accordance with the voice command.

6. A method for activating movement of a moveable closure panel in a vehicle, comprising:
- identifying a voice command to move the closure panel based on one or more sound signals indicating sound in an area surrounding the vehicle;
- identifying the location of an object in the area based on one or more proximity signals indicating objects in the area; and
- generating an instruction to move the closure panel in accordance with the voice command if the object is within a predetermined zone of the area for permitting movement of the closure panel in accordance with the voice command, wherein the voice command is to switch the position of the closure panel from an open position to a closed position, and the predetermined zone is outside of an interference zone for the closure panel where the object's presence will interfere with the movement of the closure panel from the open position to the closed position.

7. The method of claim 6, further comprising:
- identifying the object as a user of the vehicle prior to generating the instruction to move the closure panel in accordance with the voice command.

8. The method of claim 6, wherein the voice command is to switch the position of the closure panel from a closed position to an open position, and the predetermined zone is a closure panel zone adjacent to the closure panel.

9. The method of claim 6, further comprising:
- instructing a user of the vehicle to clear the interference zone if the object is within the interference zone.

10. The method of claim 6, further comprising:
- certifying a remote controller for the vehicle in the area prior to generating the instruction to move the closure panel in accordance with the voice command.

11. A vehicle, comprising:
- a closure panel supported for movement between an open position and a closed position; at least one actuator for moving the closure panel;
- at least one sound sensor for generating one or more sound signals indicating sound in an area surrounding the vehicle;

at least one proximity sensor for generating one or more proximity signals indicating objects in the area;

a first controller in communication with the at least one actuator, the at least one sound sensor and the at least one proximity sensor, the first controller programmed to:

identify a voice command to move the closure panel based on the one more sound signals, identify the presence of an object within a closure panel zone of the area based on the one or more proximity signals, control the at least one actuator to move the closure panel in response to the voice command and the object's presence within the closure panel zone, certify a remote controller for the vehicle in the area, and activate the at least one sound sensor to generate the one or more sound signals and activate the at least one proximity sensor to generate the one or more proximity signals in response to the certification of the remote controller; and an auxiliary controller being in communication with the at least one sound sensor and the at least one proximity sensor, wherein the first controller is in communication with the auxiliary controller and the remote controller, the first controller is programmed to certify the remote controller, and in response to the certification, activate the auxiliary controller, and the auxiliary controller is programmed upon activation to activate the at least one sound sensor to generate the one or more sound signals and activate the at least one proximity sensor to generate the one or more proximity signals.

12. The vehicle of claim 11, wherein the first controller is further programmed to identify the object as a user of the vehicle prior to controlling the actuator to move the closure panel.

13. The vehicle of claim 11, wherein the first controller is further programmed to:

identify a voice command to switch the position of the closure panel between the open position and the closed position based on the one or more sound signals, and control the actuator to switch the position of the closure panel in response to the voice command and the object's presence within the closure panel zone.

14. The vehicle of claim 11, wherein the first controller is further programmed to:

identify the object as being outside of an interference zone for the closure panel, where the object's presence will interfere with the movement of the closure panel, based on the one or more proximity signals, and control the actuator to move the closure panel in response to the object's presence outside of the interference zone.

15. The vehicle of claim 11, further comprising:

at least one user feedback device, wherein the first controller is in communication with the at least one user feedback device and is further programmed to:

identify the object as being in an interference zone for the closure panel, where the object's presence will interfere with the movement of the closure panel, based on the one or more proximity signals, and control the user feedback device to output instructions to clear the interference zone.

16. The vehicle of claim 11, wherein the first controller is further programmed to:

identify voice dialogue among the sound indicated by the one or more sound signals, compare the voice dialogue against data indicating one or more voice commands to move the closure panel, and if there is a match between the voice dialogue and the data, identify the voice dialogue as corresponding to the voice command.

* * * * *